S. D. RAMEY.
KITCHEN UTENSIL.
APPLICATION FILED MAR. 4, 1910.
983,400.
Patented Feb. 7, 1911.
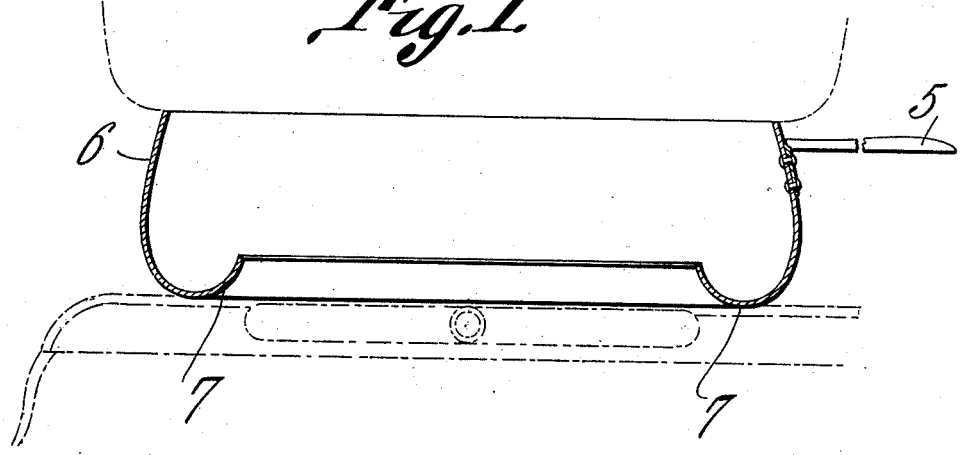
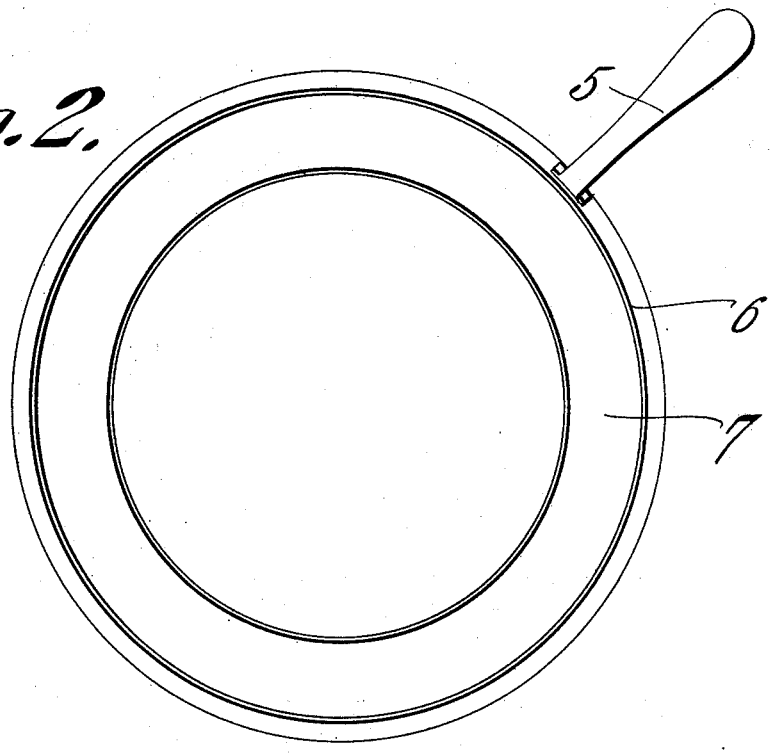
Witnesses
Inventor
Sanford D. Ramey.
By C. A. Snow & Co.
Attorneys

UNITED STATES PATENT OFFICE.

SANFORD D. RAMEY, OF WAVERLY, KANSAS.

KITCHEN UTENSIL.

983,400.

Specification of Letters Patent.

Patented Feb. 7, 1911.

Application filed March 4, 1910. Serial No. 547,308.

*To all whom it may concern:*

Be it known that I, SANFORD D. RAMEY, a citizen of the United States, residing at Waverly, in the county of Coffey and State of Kansas, have invented a new and useful Kitchen Utensil, of which the following is a specification.

It is the object of the present invention to provide a novel and useful kitchen utensil designed for employment in connection with an ordinary gas or similar stove for the purpose of economizing in fuel.

It is the aim of the invention to provide a device adapted for disposal upon an ordinary gas or similar cooking stove to support or serve as a rest for a vessel to be heated, and which will serve to concentrate the heat currents and retain them in the vicinity of the bottom of the said vessel.

In the accompanying drawings,—Figure 1 is a vertical sectional view through a kitchen utensil constructed in accordance with the present invention. Fig. 2 is a top plan view of the same.

In Fig. 1 of the drawings, the manner of using the device is clearly illustrated, there being shown in dot and dash lines, a portion of a gas or similar cooking stove, and also the bottom portion of an ordinary kitchen utensil.

As illustrated in the drawings, the device, considered generally, is annular in form and is provided, preferably, with a handle which is indicated by the numeral 5. The device is further, preferably formed, of sheet metal.

As above stated, the device, generally speaking, is annular, but it is so constructed, in cross section, that when disposed upon the top of an ordinary gas or similar cooking stove in a position to surround the burner thereof, and a vessel is disposed upon the said device, the heated currents will first strike the bottom of the said vessel and will then be deflected and, owing to the specific cross sectional contour of the device, will be returned in greater or less volume against the said bottom of the vessel.

In order to accomplish the aims and results above specifically pointed out, the device is formed with a reverberatory flange which is a continuation of the lower part of the wall of the device and it will be observed from inspection of Fig. 1 of the drawings that the said wall and the flange so merge that there is no defined point of juncture between them and that, consequently, a continuous annular surface is presented. It will further be observed from the said Fig. 1 of the drawings, that in cross section, the said wall and its flange are of semi-elliptical outline, the wall proper, being indicated in general by the numeral 6, and the flange being indicated by the numeral 7. As illustrated in the said Fig. 1, the wall is of an outline, in cross section, resembling a semi-ellipse, and more specifically an ellipse which is cut diagonally, its major end being considered as its base. The wall proper, 6, is the long side of such an ellipse, whereas the flange 7 which forms a continuation of the bottom of this said wall proper has an outline which is the arc of a circle. It will further be observed from inspection of the said figure that the concave side of the device is presented inwardly and that when properly disposed upon a cooking stove, the concavity of the said wall proper 6 will be presented directly inwardly or in other words toward the center or axis of the said device. On the other hand, the flange of the said device has its concave side presented directly upwardly, or in other words, the chord of the arc defined by the said flange in cross section, is in a horizontal plane.

What is claimed is:

A device of the class described comprising an annular, integral, continuous wall having at its bottom a continuous, integral, upwardly inwardly curved reverberatory flange, the said wall and its flange, in cross section, being of an outline corresponding to the major portion of an ellipse cut diagonally and having its major end lowermost, the said wall and flange being curved continuously from the upper to the lower edge of the device.

In testimony that I claim the foregoing as my own, I have hereto affixed my signature in the presence of two witnesses.

SANFORD D. RAMEY.

Witnesses:
GEO. W. PILKINGTON,
C. H. MIETCHEN.